(12) United States Patent
Ha et al.

(10) Patent No.: US 7,840,578 B2
(45) Date of Patent: Nov. 23, 2010

(54) METHOD FOR DETERMINING VALIDITY OF COMMAND AND SYSTEM THEREOF

(75) Inventors: Jung Soo Ha, Seoul (KR); Jung Su Kim, Seoul (KR); Woo Sung Lee, Seoul (KR)

(73) Assignee: NHN Business Platform Corporation, Seongnam-si (KR)

( * ) Notice: Subject to any disclaimer, the term of this patent is extended or adjusted under 35 U.S.C. 154(b) by 566 days.

(21) Appl. No.: 11/571,154

(22) PCT Filed: Jun. 22, 2005

(86) PCT No.: PCT/KR2005/001924

§ 371 (c)(1),
(2), (4) Date: Dec. 21, 2006

(87) PCT Pub. No.: WO2005/124595

PCT Pub. Date: Dec. 29, 2005

(65) Prior Publication Data

US 2007/0226191 A1     Sep. 27, 2007

(30) Foreign Application Priority Data

Jun. 22, 2004   (KR) ...................... 10-2004-0046415

(51) Int. Cl.
  G06F 7/00    (2006.01)
  G06F 17/30   (2006.01)
(52) U.S. Cl. ............................ 707/758; 709/219; 726/5
(58) Field of Classification Search ................. 707/1–3; 726/5; 709/219; 705/10
  See application file for complete search history.

(56) References Cited

U.S. PATENT DOCUMENTS

| 5,329,628 | A  | * | 7/1994  | Yamamoto et al. | ............. 707/8 |
| 6,983,379 | B1 | * | 1/2006  | Spalink et al.  | ............. 705/10 |
| 7,136,860 | B2 | * | 11/2006 | Doliov          | ............. 707/101 |

(Continued)

FOREIGN PATENT DOCUMENTS

KR    2000-49795 A    8/2000

(Continued)

*Primary Examiner*—Kuen S Lu
*Assistant Examiner*—Sabana Rahman
(74) *Attorney, Agent, or Firm*—Husch Blackwell LLP

(57) ABSTRACT

There are provided a method and system for determining the validity of a command, which includes: a first step of receiving a command including a predetermined query from a terminal of a user; a second step of generating log information associated with the command, in which the log information includes at least one of the query included in the command, input time point information on a time point of inputting the command, and a network address of the terminal; a third step of recording the log information in a log database; a fourth step of calculating a first determination result with respect to the validity of the command according to a predetermined first determination standard; a fifth step of including identification information determined according to the first determination result in the log information and recording in the log database; a sixth step of periodically searching for log information recorded for a first period with reference to the log database; and a seventh step of determining again the validity of the command by using the searched log information according to a predetermined second determination standard and calculating a second determination result.

23 Claims, 6 Drawing Sheets

U.S. PATENT DOCUMENTS

| | | | |
|---|---|---|---|
| 7,234,156 B2 * | 6/2007 | French et al. | 726/2 |
| 2001/0051939 A1 * | 12/2001 | Yoshimura et al. | 707/3 |
| 2002/0073046 A1 * | 6/2002 | David | 705/67 |
| 2003/0041136 A1 * | 2/2003 | Cheline et al. | 709/223 |
| 2004/0177276 A1 * | 9/2004 | MacKinnon et al. | 713/201 |
| 2004/0247155 A1 * | 12/2004 | Eguchi | 382/100 |
| 2005/0144333 A1 * | 6/2005 | Kotzin | 710/15 |
| 2005/0262060 A1 * | 11/2005 | Rohwedder et al. | 707/3 |
| 2007/0083938 A1 * | 4/2007 | Aoki et al. | 726/30 |

FOREIGN PATENT DOCUMENTS

| | | |
|---|---|---|
| KR | 2000-59129 A | 10/2000 |
| KR | 2001-86259 A | 9/2001 |
| KR | 10-2002-7010554 | 7/2006 |

* cited by examiner

FIG. 4

| IP ADDRESS INFORMATION | INPUT TIME POINT INFORMATION | OPERATION | IDENTIFICATION INFORMATION |
|---|---|---|---|
| 123.123.123.123 | 2004/04/16, 02:30:25 — 401 | ACCESS MAIN PAGE | |
| | 2004/04/16, 02:31:02 | INPUT SEARCH QUERY | 0 |
| | 2004/04/16, 02:31:40 | PROVIDE SEARCH RESULT LIST | |
| | 2004/04/16, 02:32:16 | SELECT SEARCH RESULT — 402 | 0 |
| | 2004/04/16, 02:34:16 | SELECT SEARCH RESULT | 2 |

METHOD FOR DETERMINING VALIDITY OF COMMAND AND SYSTEM THEREOF

CROSS REFERENCE TO RELATED APPLICATIONS

This application is a U.S. National Phase Application of International Application PCT Application No. PCT/KR2005/001924 filed on Jun. 22, 2005, which claims the benefit of priority from Korean Patent Application No. 10-2004-0046415 filed on Jun. 22, 2004. The disclosures of International Application PCT Application No. PCT/KR2005/001924 and Korean Patent Application No. 10-2004-0046415 are incorporated herein by reference.

TECHNICAL FIELD

The present invention relates to a method of determining the validity of a command inputted from a user and a system employing the same, and more particularly, to a command validity determination method and a system employing the same, in which 1) the validity of the command is firstly determined at a time point of inputting the command and secondly determined after the lapse of time by using information collected for the period and 2) particularly, an intermediate area of "suspected to be invalid is set up and a command determined to be suspected to be invalid as a first determination result is secondly determined, thereby more precisely determining the validity of the command.

BACKGROUND ART

In a server/client model, a client accesses a server via communication network and inputs a command including a predetermined query and the server responds to the user terminal with a response corresponding to the query.

However, the user may inputs the command for another purpose instead of receiving the response.

For example, a search server providing a search service may statistically analyze a search query of a user and use the search query in generating search result list in order to provide a search result list according to the preference of the user.

Since a search result "frequently" selected by a user receiving a predetermined search result list is considered to have high relation with a search query and be highly preferred by users, the search server adds the preference to the search result such that the search result is preferentially provided to a user with respect to the search query.

In this case, "search result selection" of the user is used as "a query for receiving information associated with the search result or accessing a web page associated with the search result". On the other hand, "search result selection" is used as "a standard for generating a search result list". A user knowing the mechanism in the search server may repeatedly select the same search result from the search result list provided in response to a predetermined search query such that the preference is added to the search result selected by the user. Of course, in case that the user repeatedly selects a search result with malicious intent and the preference is added to the search result, an original purpose to preferentially provide a search result having high relation with the search result and preferred by users can not be achieved.

Accordingly, in case that a user inputs a command including a query for selecting a search result, it is necessary that a search server determines whether the command is inputted with malicious intent. In case that the command is inputted with malicious intent as a result of determination, information associated with the search result according to the query but the query may not be used as a standard to generate a search result list. As described above, it is require to determine whether "a command" including a query of a user, which is inputted to a predetermined system, is generated with malicious intent of some users, which is different from that the system aims at. A command inputted with malicious intent is preferable to be determined to be "invalid" and an original effect by the command (for example, adding the preference to the search result, as described above) may not be generated.

Korean Patent Application No. 10-2002-7010554 (Title of the invention: A System and method to determine the validity of an interaction on a network, hereinafter referred to as "cited reference 1") discloses various method of determining whether a command is inputted with malicious intent, in addition to disclosed technology.

The cited reference 1 indicates an interaction inputted with malicious intent of a user as "an illegal interaction" in the specification.

The cited reference 1 includes 1) collecting data including "collective type data' and "a unique characteristic data" is collected from a user interaction on network, 2) storing data in a database, 3) constructing an estimated model by the collective type data and the unique characteristic data in order to identify an illegal interaction with a network, 4) identifying an illegal interaction in the database by using the estimated model.

The cited reference discloses 'a search listing click/the number of a user ID per unit time', 'entry source/the number of a user ID per unit time', and 'an advertiser accepting a click that is possible to request/the number of a user ID per time unit' as "the collective type data".

Also, the cited reference 1 discloses 'the data of a click generating income' and 'a time stamp of a click generating income' as "the unique characteristic data".

Also, in case that an interaction is inputted, the cited reference 1 determines whether the interaction is valid by using the estimated model. Namely, "acceptable but uncommon class (ABUC) value", "normal behavior class (NBC) value", and "unacceptable class (UC) value" [with respect to an interaction] are respectively computed, and the interaction is determined to be a class having the largest value among them.

However, the cited reference 1 treats an interaction having "acceptable but uncommon class value" as a valid interaction, and there is a room for doubt that the interaction may be suspected to be an invalid interaction from the term of "acceptable but uncommon class value".

Accordingly, according to the cited reference 1, after the interaction in a category of valid but still suspected to be invalid is determined to be "valid" once, the interaction becomes a valid interaction. Therefore, an illegal interaction is possible to be determined to be a valid interaction.

The cited reference 1 tries to solve the problem described above by periodically revaluating a mathematical equation to compute the ABUC value, the NBC value, and the UC value and generating a new model. However, since the solution is applied to only a new interaction newly inputted after an interaction that may be an illegal interaction is determined to be valid, a previous determination result can not be changed.

Accordingly, a new validity determination method is required, which can solve the problem of the prior art and can precisely determine whether a command is valid.

DISCLOSURE OF INVENTION

Technical Goals

According to the present invention, a method and system for determining the validity of a command are provided, in which the validity of a command is more precisely determined by determining a plurality of times whether the command is valid.

Also, according to the present invention, a method and system for determining the validity of a command are provided, in which the validity of a command is more precisely determined by determining a plurality of times at a different time interval, for example, at a time point of inputting the command, 1 hour after inputting the command, and 24 hours after inputting the command and using information collected in the meantime.

Also, according to the present invention, a method and system for determining the validity of a command are provided, which can determine the validity of the command a plurality of times according to a plurality of determination standards different from each other.

Also, according to the present invention, a method and system for determining the validity of a command are provided, which perform additional validity determination with respect to a command whose previous determination result is the same in case that the validity of the command is determined a plurality of times.

Also, according to the present invention, a method and system for determining the validity of a command are provided, which can more precisely determine the validity of the command by setting up an intermediate area of being suspected to be invalid in addition to being valid or invalid, determining the be suspected to be invalid in case that it is difficult to determine to be valid or invalid, and determining again the validity of a command determined to be suspected to be invalid by using collected information. Also, according to the present invention, additional validity determination is performed only in case of a command whose previous determination result is suspected to be invalid.

Also, according to the present invention, a method and system for determining the validity of a command are provided, in which, in association with search service such as keyword search or category search, 1) in case that a command including a query for performing a certain advertisement is determined to be valid as a first determination result, the account balances of an advertiser associated with the advertisement is subtracted (or a cost charged on the advertiser is increased.), thereby rapidly paying an advertisement cost, and 2) in case that the command is determined to be invalid as a second determination result, the account balances is increased as the subtracted amount, thereby precisely allotting an advertisement cost in order to protect the profit of an advertiser.

Also, according to the present invention, a method and system for determining the validity of a command are provided, which can determine the validity of the command by using a determination result value computed by using a plurality of determination standards whose weight is different. In this case, in case that the validity of the command can be determined by using the determination result value computed by using some of the plurality of the determination standards, the validity of the command is determined not by using the other determination standards, thereby reducing the load on the system.

Also, according to the present invention, a method and system for determining the validity of a command are provided, which can give a determination order to the plurality of the determination standards for each weight and compute a determination result value by using some determination standards selected according to the determination order, thereby minimizing the load on the system.

Also, according to the present invention, a method and system for determining the validity of a command are provided, with respect to a terminal inputting commands determined to be invalid over a certain standard, information including warning against commands inputted from the terminal, thereby warning a user of the terminal.

Technical Solutions

To achieve the goals and solve the described problem of the prior art, there is provided a method of determining the validity of a command, including: a first step of receiving a command including a predetermined query from a terminal of a user; a second step of generating log information associated with the command, in which the log information includes at least one of the query included in the command, input time point information on a time point of inputting the command, and a network address of the terminal; a third step of recording the log information in a log database; a fourth step of calculating a first determination result with respect to the validity of the command according to a predetermined first determination standard; a fifth step of including identification information determined according to the first determination result in the log information and recording in the log database; a sixth step of periodically searching for log information recorded for a first period with reference to the log database; and a seventh step of determining again the validity of the command by using the searched log information according to a predetermined second determination standard and calculating a second determination result.

Also, according to an aspect of the present invention, the first period is selected as at least one value and the sixth step and the seventh step are performed, respectively, based on the value.

Also, according to another aspect of the present invention, the sixth step includes a step of periodically searching log information including identical identification information and recorded for the first period with reference to the log database.

Also, according to still another aspect of the present invention, the first determination result is one of valid, invalid, or suspected to be invalid and the fifth through seventh steps are performed in case that the first determination result is the suspected to be invalid.

To easily explain the present invention, terms used in the specification are defined as following.

Terms Used in the Specification

1) Command

"A command" is used in the specification as a comprehensive term that includes a query of a user, for performing a predetermined operation in a predetermined server system, and all command generated in a certain form according to the server system.

2) Invalid Command

It means a command determined to be invalid according to a certain determination standard. The server system may not perform the predetermined operation with respect to an invalid command or perform an operation different from the predetermined operation.

3) Valid Command

It means a command determined to be valid according to a certain determination standard. The server system performs the predetermined operation according to a valid command.

4) Command Suspected to be Invalid

It means a command that is difficult to determine to be valid or invalid as a result of determining according to a certain determination standard. It may be administratively determined whether the server system performs the predetermined operation with respect to a command suspected to be invalid. Only, the predetermined operation may be compensated or adjusted in case that it is definitely determined whether the command is valid or invalid.

5) First Determination Result Through Nth Determination Result

In case that it is at least once determined according to the present invention whether a command is valid (N times, N is a natural number not less than 1.), N determination result is (or are) computed. A determination result computed according to a first determination standard is designated as a first determination result, and a determination result computed according to an Nth determination standard is also designated as an Nth determination result.

The Nth determination standard used for determining the validity of a command may include at least one determination standard, and the first through Nth determination standard may be identical with or different from each other.

6) First Determination Through Nth Determination

In the specification, it is designated as an Nth determination to determine the validity of a command for the Nth time according to an Nth determination standard.

7) M Determination Standards and a Weight Corresponding to Each Determination Standard.

In the present invention, a weight may be added to a plurality of (M, M is a natural number not less than 2.) determination standards included in the Nth determination standard, respectively, to compute the Nth determination result. Accordingly, all of M determination standards are used as data for computing one determination result.

8) Advertisement Search Result and General Search Result

In an advertisement system providing a keyword search advertisement or a category search advertisement, a search result that is registered because an advertiser pays an advertisement cost for purpose of advertisement is designated as "an advertisement search result" and a search result provided to users regardless of advertisement is designated as "a general search result".

BRIEF DESCRIPTION OF DRAWINGS

FIG. 4 is a diagram illustrating an example of log information recorded in a log database in an embodiment of the present invention;

BEST MODE FOR CARRYING OUT THE INVENTION

Hereinafter, the embodiments of the present invention will be described in detail with reference to the attached drawings.

Figure 1:
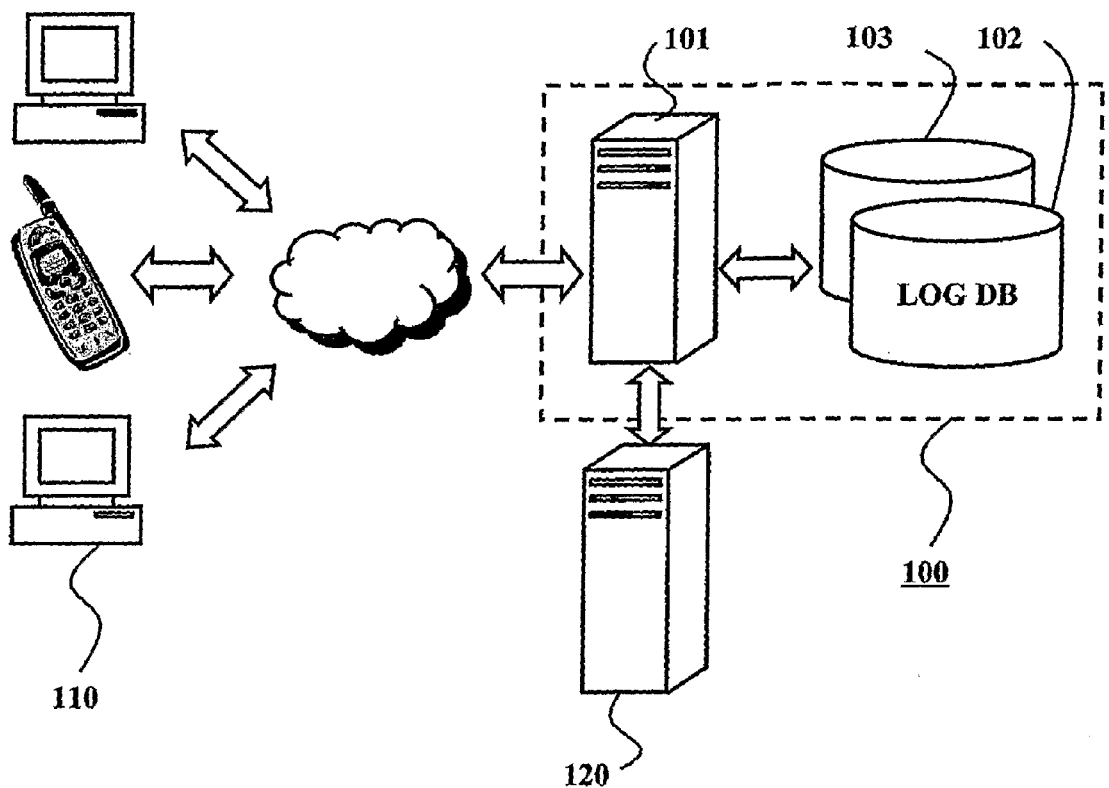
FIG. 1 is a diagram illustrating network connection of a determination system performing a method of determining the validity of a command, according to the present invention.

FIG. 1 is a diagram illustrating network connection of a determination system performing a method of determining the validity of a command, according to the present invention. A determination system 100 includes a determination server 101, a log database 102, or a block network address database 103 and may be connected to a terminal 110 of a user via wired or wireless communication network. The determination server 101 determines whether a command inputted from a user is valid. A search server 120 may perform different operations according to whether the command is valid or invalid.

Figure 2:
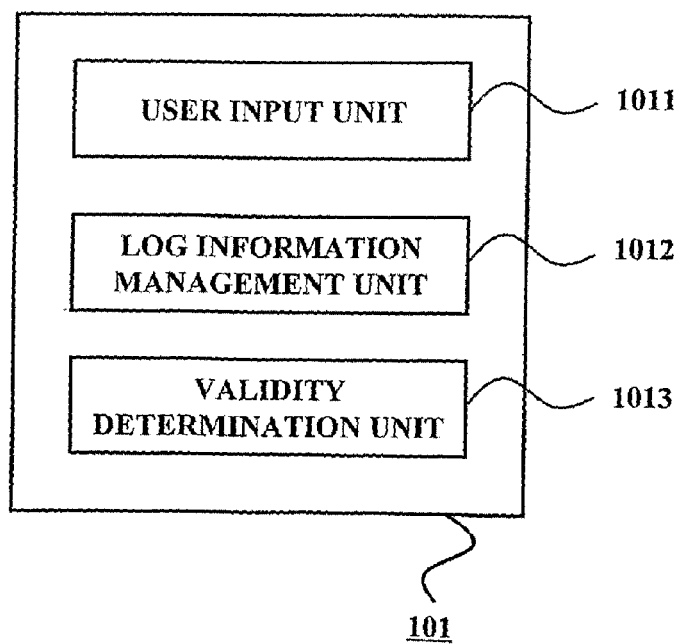
FIG. 2 is a block diagram illustrating the configuration of a determination server included in the determination system according to an embodiment of the present invention.

FIG. 2 is a block diagram illustrating the configuration of the determination server 101. The determination server 101 includes a user input unit 1011, a log information management unit 1012, and a valid determination unit 1013.

Hereinafter, it is described as an example that the determination system 100 determines the validity of a command in case that a user inputs the command associated with search in the search server 120 providing search service. This is just an illustrative example, and the search server 120 is a concept including a server providing various services according to client/server model, such as search service, game service, and reservation service.

Also, the determination server 101 for determining the validity of a command inputted from a user may be embodied as the same apparatus as the search server 120 or operate being coupled with the search server 120.

Figure 3:
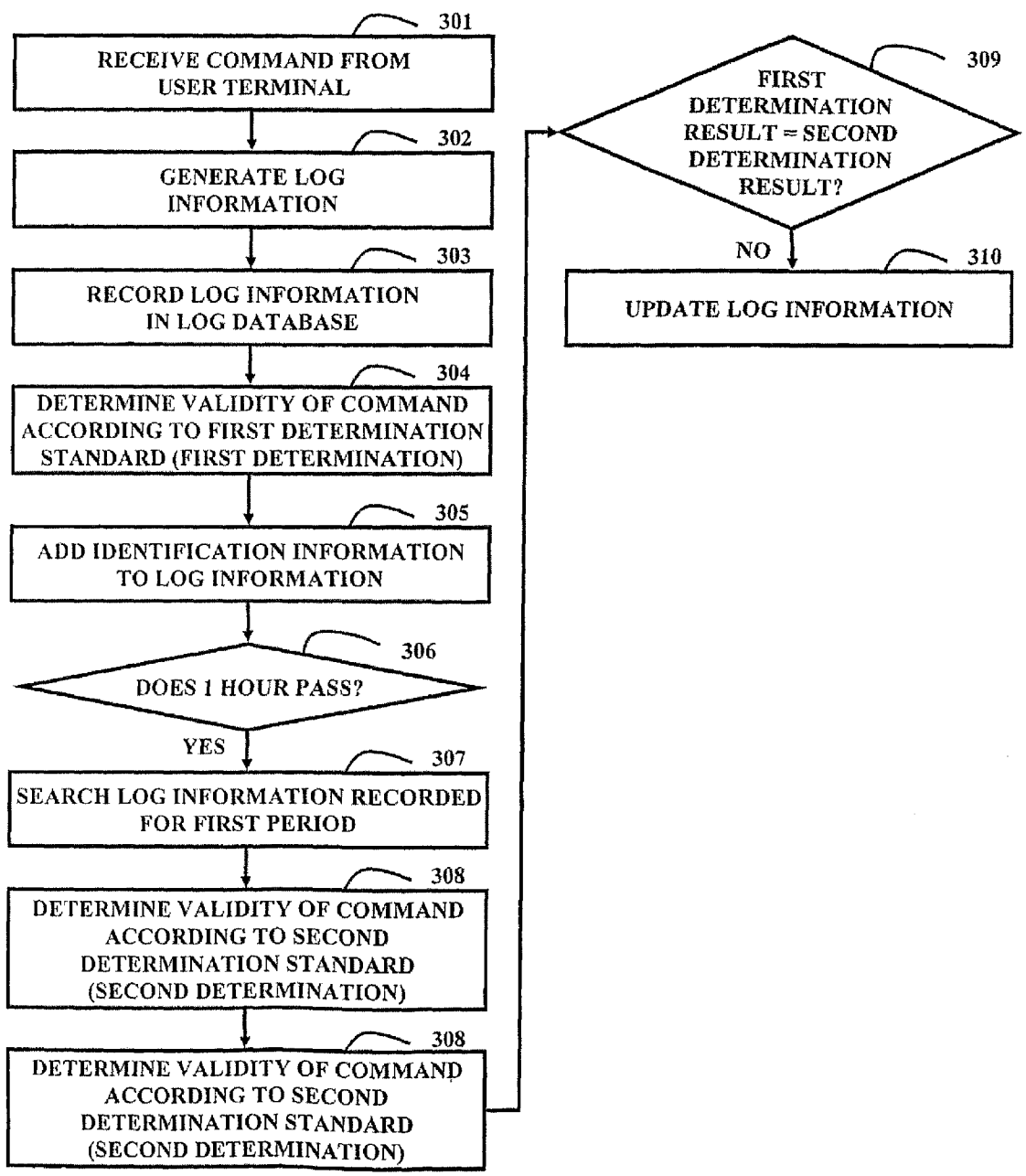
FIG. 3 is a flow chart illustrating a command validity determination method according to an embodiment of the present invention.

FIG. 3 is a flow chart illustrating a command validity determination method according to an embodiment of the present invention.

The user input unit 1011 receives a command from the terminal 110 of the user (Step 301), and the log information management unit 1012 generates log information associated with the command (Step 302). The log information includes a predetermined query, input time point information on the input point of the command, a network address of the terminal. For example, an IP address may be used as the network address.

In Step 303, the log information management unit 1012 records and maintains the log information in the log database 102. FIG. 4 is a diagram illustrating an example of the log information recorded in the log database 102. As illustrated, the log information may be recorded for each network address of a terminal. Also, according to another embodiment of the present invention, the log information may be recorded and maintained according to the sort of a query included in a command. For example, log information on a command including a query for selecting a predetermined search result from a search result list may be separately maintained and managed. Also, according to still another embodiment of the present invention, the log information may be recorded and maintained sequentially according to the input time point.

In Step 304, the validity determination unit 1013 determines the validity of a command according to a first determination standard. The determining the validity of the command according to the first determination standard may be performed in real time according to the input of the command. As described above, it is a first determination that the validity of the command is determined according to the first determination standard, and at least one determination standard may be used as the first determination standard.

For example, the first determination standard is whether the command is inputted from a terminal having a network address recorded in the block network address database 103. In the block network address database 103, a network address of a terminal inveterately inputting an invalid command or inputting a plurality of invalid commands are recorded. The command inputted from the terminal whose network address is registered in the block network address database 103 may be determined to be invalid or suspected to be invalid, As described above, the determination result computed according to the first determination standard is a first determination result.

On the other hand, the determination method according to the present invention may divide a determination result with respect to a predetermined command into invalid, valid, or suspected to be invalid. For example, in case that the command is difficult to affirmatively determine to be valid or invalid because the determination result with respect to the predetermined command is within selected error range, the command is determined to be suspected to be invalid.

Various determination standards including determination standards according to a conventional art may be used as the first through Nth determination standards used in the present invention, and the scope of the present invention is not restricted by the sort of the determination standard.

In Step 305, the log information management unit 1012 includes identification information determined according to the first determination result in the log information and records in the log database 102.

The log information management unit 1012 generates identification information different from each other according to the first determination result. For example, the identification information may be generated as '0' in case that the command is valid as the first determination result, '1' in case that the command is invalid, and '2' in case that the command is suspected to be invalid. As illustrated in FIG. 4, identification information included in log information associated with a command for selecting a search result, which is inputted at 2:34:16, Apr. 16, 2004, is '2'. Namely, it means that the command is determined to be suspected to be invalid.

The validity determination unit 1013 determines again whether commands periodically inputted for a first period, according to a second determination standard. For example, the first period is 1 hour, and the validity determination unit 1013 determines whether the command inputted for 1 hour is valid, according to the second determination standard by using log information.

The validity determination unit 1013 determines whether 1 hour passes after the first determination is performed in Step 306 and determines the validity of the commands based on log information associated with the commands inputted for 1 hour in Steps 307 and 308. For example, one of the second determination standards may be whether mathematical rule is found at input time point information associated with the command inputted for 1 hour. It is a second determination that the validity of a command is determined according to the second determination standard.

The validity determination unit 1013 searches log information recorded for 1 hour from the log database 102 in Step 307 and determines the validity of the command according to the second determination standard by using the searched log information in Step 308.

According to another embodiment of the present invention, the validity determination unit 1013 performs for each group whose first determination result is the same, namely, whose identification information is the same. For example, the validity determination unit 1013 searches log information whose identification information is '2' from the log information recorded for 1 hour in Step 307 and determines the validity of a command associated with the searched log information according to the second determination standard in Step 308. Namely, the second determination may be performed with respect to only the command at different time interval, which is determined to be suspected to be invalid as the first determination result.

Also, according to still another embodiment of the present invention, the validity determination unit 1013 may search log information on a command whose sort of query is identical or similar and determine the validity of the command.

Also, according to yet another embodiment of the present invention, the validity determination unit 1013 may search log information on a command whose network address or network group (for example, network class according to IPv4) identified by a network address is identical and determine whether the command is valid.

By the described configuration, according to the present embodiment, in case that the validity determination unit 1013 determines whether the command is valid by using a predetermined determination standard and the command is difficult to be determined to be valid or invalid as a result of determination, the command may be classified into suspected to be invalid and it is left open that the command is definitely determined to be valid or invalid. Also, if the command is determined to be suspected to be invalid, the validity of the command is determined again by using additional log information collected for a predetermined period, thereby more precisely determining whether the command is valid. Particularly, the validity of the command is determined again by using a determination standard different from the determination standard used in the previous determination, which is proper to interpret the additional log information, thereby more precisely determining whether the command is valid.

For example, in case that input time point information is 2:00, May 5, 2004, which is included in the log information associated with the command classified into suspected to be invalid as the first determination result, and commands are inputted from a terminal inputting the command at a regular time interval of 5 minutes, such as 2:5, May 5, 2004, 2:10, May 5, 2004, 2:15, May 5, 2004, . . . , the command may be determined to be a invalid command automatically generated by using a command auto-generation program. Accordingly, the validity determination unit 1013 may definitely determine the command classified as suspected to be invalid to be invalid. Also, the validity determination unit 1013 may determine all of the commands to be invalid, which are inputted at the regular interval from the terminal as described above.

As described above, according to the present invention, the validity of the command is firstly determined at the input time point in real time, thereby rapidly performing the predetermined operation. After the lapse of time, the second determination with respect to the command is performed by using the log information collected for the time, namely, it is determined several times whether the command is valid at a different time interval, thereby precisely determining whether the command is valid.

Also, according to the present embodiment, the second determination on the command is performed in case that it is not clear whether the command is valid by the first determination, thereby precisely determining whether the command is valid and reducing the load on the system.

On the other hand, at least one determination standard used in the first determination performed in real time and the second through Nth determination performed after the lapse of time may be properly selected by considering that the determination is performed "in real time" or "after the lapse of time".

In case that the first determination result is different from the second determination result, the log information management unit 1012 updates the log information associated with the command by using the identification information according to the second determination result in Step 310 and records in the log database 102.

For example, in case that identification information included in log information associated with a command determined to be suspected to be invalid as a first determination result is '2' and the command is determined to be invalid as a second determination result, the log information management unit 1012 updates the identification information to be '1'.

In case that the first determination result is identical with the second determination result, the log information management unit 1012 may not perform an additional process because an original determination is precise.

On the other hand, it is described for example in the present embodiment that the first period is 1 hour, the first period may be differently set up according to embodiments, such as 30 minutes, 2 hours, and 24 hours. Also, the validity determination unit 1013 may further perform a third determination, . . . , an Nth determination at a different time interval in addition to the first determination and the second determination. For example, the validity determination unit 1013 may determine the validity of one command, performing first determination at the input time point in real time, second determination after 1 hour, and the third determination after 24 hours.

Also, according to another embodiment, the validity determination unit 1013 may perform a first determination on all commands in real time, a second determination on commands determined to be suspected to be invalid from commands inputted for 1 hour, and a third determination on all commands inputted for 24 hours. Determinations next to the second determination may be performed for each selected group such as a valid group, an invalid group, a suspected to be invalid group, and the entire command group.

On the other hand, according to still another embodiment, the validity determination unit 1013 may select "invalid" and "valid" and not select "suspected to be invalid" as the Nth determination, namely, the Nth determination result according to a final determination in order to prevent that the validity of the command is not precisely determined. Also, the validity determination unit 1013 may select any one of "invalid", "valid" and "suspected to be invalid" and may select a policy in which the predetermined operations are identically performed on a command that is finally determined to be invalid or suspected to be invalid. For example, in case that a command for selecting a predetermined advertisement search result is finally determined to be invalid or suspected to be invalid, an advertisement cost may not be charged to an advertiser associated with the advertisement search result.

Also, according to yet another embodiment of the present invention, the determination server 101 updates a block network address recorded in the block network address database 103 according to the Nth determination result. In case that the determination system 100 performs valid determination N times, a user of a terminal inputting a command determined to be invalid according to the Nth determination result that is a final determination result more than a certain frequency or certain number may be known as a bad user inputting habitually inputting an invalid command. Accordingly, the determination server 101 records a network address of the terminal in the block network address database 103 and may not allow a predetermined operation according to a query included in a command to be performed in case that the command is inputted from the terminal whose network address is recorded in the block network address database 103. For example, though a command selecting a search result is inputted, the search server 120 may not provide information associated with the search result and not relay an access to a webpage associated with the search result. Also, in case that the command is inputted, the determination system 100 may transmit a webpage screen including warning information to the terminal.

Also, according to another embodiment of the present invention, the log information management unit 1012 may give predetermined identification information with respect to only a command determined to be suspected to be invalid as the first determination result. Accordingly, the identification is not included in log information associated with a command determined to be valid as the first determination result.

Also, according to another embodiment of the present invention, the log information management unit 1012 may maintain the log database 102 for each of valid, invalid, and suspected to be invalid in stead of using identification information in order to classify whether a command is valid, invalid, or suspected as invalid as the first through the Nth determination result. For example, in case that a predetermined command is determined to be suspected to be invalid as the first determination result, log information associated with the command is recorded in an suspected to be invalid log database. After, in case that the command is determined to be invalid as the second determination result, the log information is deleted from the suspected to be invalid log database and added in an invalid log database.

Also, the first determination result through the Nth determination result associated with the command may be recorded in an additional database as information in addition to log information, which belongs to the scope of the present invention.

Hereinafter, a command validity determination method according to another embodiment of the present invention will be described. In case that a plurality of determination standards for computing a result of determining a command are used, the present embodiment includes a constitution for more effectively computing the determination result by using the plurality of the determination results.

On the other hand, the command validity determination method according to the present embodiment may be independently performed or may be performed by combining with the command validity determination method according to the described embodiment. For example, in case that a first determination result is computed according to a first determination standard included in the plurality of the determination results, the command validity determination method according to the present embodiment may be applied.

Figure 5:
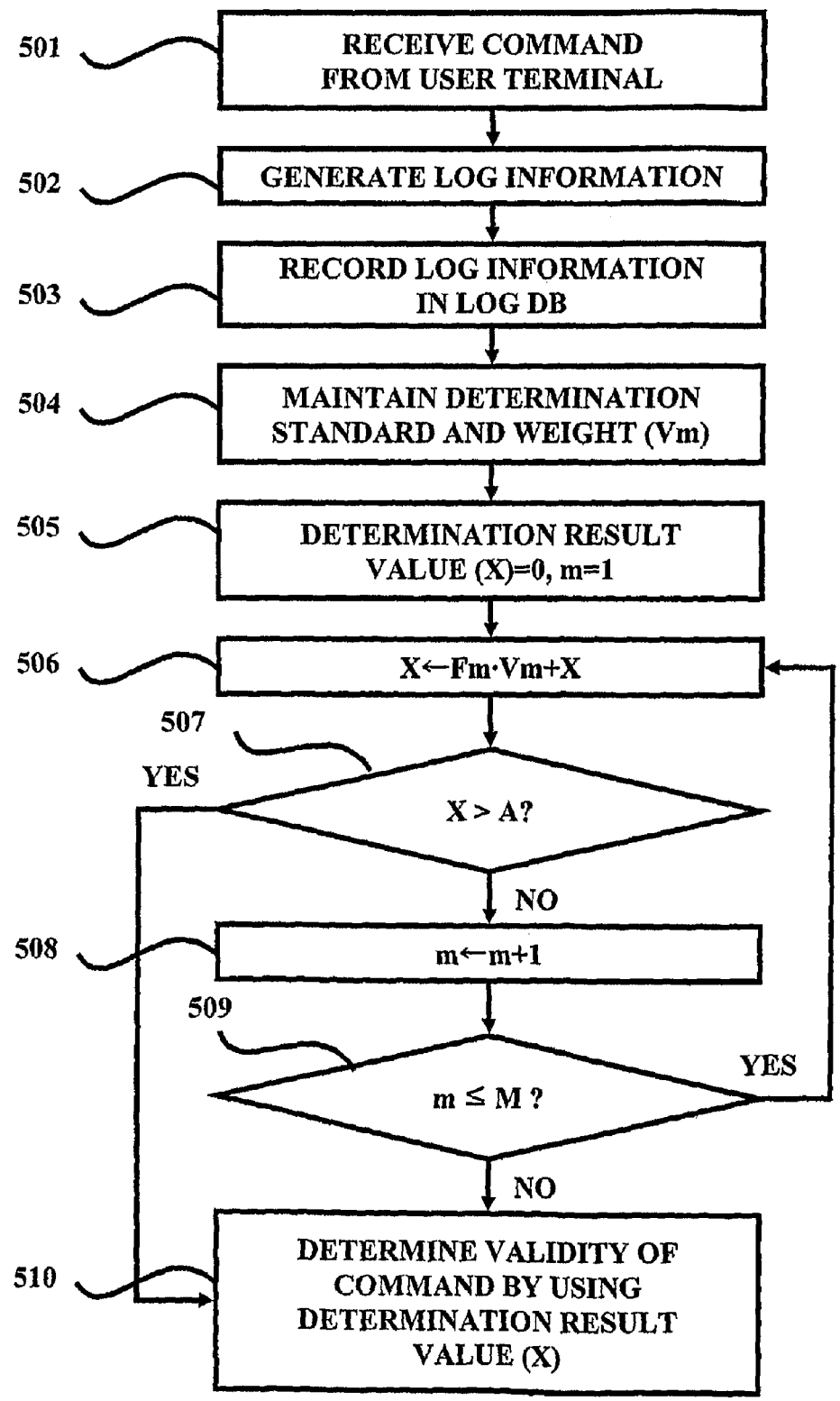
FIG. 5 is a flow chart illustrating a command validity determination method according to another embodiment of the present invention.

Hereinafter, the command validity determination method according to the present embodiment will be described with reference to FIG. 5. The command validity determination method according to the present embodiment may be performed by the determination system 100. Since the description on Steps 501 through 503 of FIG. 5 corresponding to Steps 301 through 303 of FIG. 3 is fully explained in the described embodiment, the description will be omitted in the present embodiment.

In Step 504, the determination system 100 maintains a weight corresponding to each of M determination standards. M may be a natural number that is 2 or more. A determination index computed according to the determination standard is $F_m$, and a weight corresponding to the determination standard is $V_m$, in which m is selected from natural numbers not less than 1 and not more than M. Accordingly, M (determination index, weight) couples exist, such as $(F_1, V_1), (F_2, V_2), \ldots$ and $(F_M, V_M)$.

The determination system 100 may compute each of the determination indexes by using log information associated with the command according to the determination standard and compute a determination result value by adding the weight to the determination index. Accordingly, if the determination result value is X, the determination result value X is computed as $$X=(F_1 \times V_1)+(F_2 \times V_2)+(F_3 \times V_3)+, \ldots, +(F_M \times V_M).$$

In case that the determination index is computed as a value 0 or more and the higher the possibility of determination result invalid is, the higher determination index is computed, for example, the determination system 100 may determine the command to be valid in case that the determination result value X is not less than 0 and not more than 100, invalid in case that the determination result value X is more than 300, and suspected to be invalid in case that the determination result value X is more than 100 and not more than 300.

However, in case that the determination system computes only $(F_1 \times V_1)$ and $(F_1 \times V_1)$ is more than 100, it is obvious that $(F_1 \times V_1)+(F_2 \times V_2)+(F_3 \times V_3)+, \ldots, +(F_M \times V_M)$ is also more than 100. It is unnecessary computation procedure to further compute each of $(F_1 \times V_1)+(F_2 \times V_2)+(F_3 \times V_3)+, \ldots, +(F_M \times V_M)$ and the sum of the same.

Particularly, the more elaborate the determination standard for determining the validity of a command is, the higher the possibility in which a processor means and memory means of the determination system 100 are used for a long time or largely used for computing the each of the determination indexes $F_1, F_2, \ldots$ is.

Accordingly, according to another embodiment of the present invention, the determination system 100 selects a method in which a determination result value is computed by using some of the determination standards and the other determination standards are not used in case that the determination result value is more than a predetermined standard value. Hereinafter, the method will be described by using Steps 504 through 510 of FIG. 5.

In Step 505, the determination system 100 computes the determination index $F_1$ with respect to the command by using the log information according to a predetermined determination standard and computes an increment $(F_1 \times V_1)$ via multiplying the $F_1$ by $V_1$. Also, the determination system 100 adds the increment to an initialized determination result value X and updates the determination result value X.

Accordingly, the determination result X is updated from 0 to $(F_1 \times V_1)$. For example, in case that $F_1$ is 32 and $V_1$ is 10, the determination result value is 320.

As described above, if it is described for example whether a mathematical rule exists between input time points of commands inputted from a predetermined terminal as a determination standard for determining the validity of a predetermined command, the determination system 100 may compute the determination index $F_1$ as large in case that commands inputted from the terminal, between whose input time points the mathematical rule exists, and may compute $F_1$ as larger in case that the command between whose input time points the mathematical rule exists is inputted more than a predetermined number for a certain period.

In Step 507, the determination system 100 determines whether the updated determination result value X is more than a predetermined standard value A. The standard value may be selected by a manager of the determination system 100 and may be changed into a value capable of computing a more precise determination result by performing a procedure of verifying the command validity determination result by the determination system 100.

In case that the updated determination result value X(=320) is more than A(=300) as a result of determining, the determination system 100 determines the command to be invalid (Step 510). In this case, the determination system 100 does not use the other (M-1) determination standards in determining the validity of the command. Namely, a procedure of computing each of the (M-1) determination indexes and a procedure of adding a weight to the each of the determination indexes to update the determination result value are omitted.

As the described constitution, the determination system 100 may definitely determine a command that is sufficiently determined to be invalid according to some determination standards and does not use the other determination standards, thereby reducing the amount of operation in the determination system 100.

On the other hand, in case that the computed increment $(F_1 \times V_1)$ is 30 and the updated determination result value X(=30) is not more than the standard value A(=30), the determination system 100 increases the m as 1, namely, it is set as m=2 (Step 508) and computes the increment $(F_2 \times V_2)$ (Step 506).

In Step 506, the determination system 100 adds the increment $(F_2 \times V_2)$ to the determination result value X to update the determination result value X. Accordingly, the updated determination result value X is updated as $X=(F_1 \times V_1)+(F_2 \times V_2)$.

Also, In Step 507, in case that the updated X is more than the standard value A, the determination system 100 determines the command to be invalid. In case that the X is not more than the standard value A, the determination system 100 updates m as 3 (Step 508) and performs Step 506 again.

Steps 506 through 509 are repeatedly performed till the updated determination result value X is more than the standard value A or m becomes M. In case that the determination result value X is more than A, the determination system 100 determines the command to be invalid in Step 510.

On the other hand, in case that the determination result value X is computed by performing Step 506 again, the determination result value X is $X=(F_1 \times V_1)+(F_2 \times V_2)+(F_3 \times V_3)+, \ldots, +(F_M \times V_M)$, as described above. The determination system 100 may determine the command to be invalid in case that the determination result value X is more than the standard value A(=300) in Step 510, determine the command to be valid in case that the determination result value X is from 0 to 100, and determine the command to be suspected to be invalid in case that the determination result value X is more than 100 and not more than 300. Also, according to embodiments, only invalid and valid may be selected as a result of determining the validity of a command. For example, the command may be determined to be invalid in case that the determination result value X is more than 300 and determined to be valid in case that the determination result value X is not more than 300.

Accordingly, with respect to a predetermined command, the determination system 100 may determine the validity of the command by computing $(F_1 \times V_1)$ at minimum. With respect to another command, the determination system 100 may determine the validity of the command by computing all $(F_1 \times V_1)+(F_2 \times V_2)+(F_3 \times V_3)+, \ldots, +(F_M \times V_M)$ at maximum.

Accordingly, according to the present embodiment, the load on the determination system 100 may be greatly reduced in comparison with the described embodiments in which all $(F_1 \times V_1)+(F_2 \times V_2)+(F_3 \times V_3)+, \ldots, +(F_M \times V_M)$ are computed with respect to all commands to determine the validity.

Particularly, according to another embodiment of the present invention, the determination system 100 may determine each of the determination indexes $F_m$ and $V_m$ according to the size of each weight corresponding to each determination standard. Namely, the determination system 100 determines a weight that is the largest in weights corresponding to the determination standard to be $V_1$. For example, in case that M is 4, namely, the validity of the command is determined by using 4 determination standards, if the weights corresponding to the determination standard are 10, 20, 30, 20, and 30 respectively, the weights are $V_{1=30}$, $V_2=30$, $V_3=20$, and $V_4=10$. Accordingly, it is natural that the determination index according to the determination standard corresponding to the weight $V_1$ is determined to be $F_1$.

By the described constitution, according to the present embodiment, the determination system 100 updates the determination result value X by using the determination standard whose weight is large first. Accordingly, since the determination standard whose weight is large is used first, a possibility in which the updated determination result value X is more rapidly over A in comparison with a case of using the determination standard according to a random order becomes high. Namely, it is effectively prevented that unnecessary operation procedures are performed in the determination system 100.

For example, in case that a couple of a determination index computed by each of the determination standards and a weight corresponding to the determination index are, respectively, as (10, 6), (30, 6), (20, 4), and (30, 5), if an order to use each of the determination standards is selected as described above according to the described embodiment, the determination system 100 may repeat Step 506 three times till the updated X is more than the standard value A(=300), such as X=(10×6)=60, updated X=(10×6)+(30×6)=240, and X that is updated again=X=(10×6)+(30×6)+(20×4)=320.

On the other hand, in case that the couples of the determination index and the weight are arranged according to the size of the weight, such as (30, 6), (30, 5), (20, 4), and (10, 6) to choose the order to use each of the determination standards, the determination system 100 repeats Step 506 two times till the updated X is over the standard value A(=300), such as X=(30×6)=180 and updated X=(30×6)+(30×5)=330. Namely, the amount of operation performed to determine the validity of the same command by using the same determination standard and the same weight may be reduced.

The case in which the higher a possibility of being invalid is the higher a determination index is calculated is described. Since a constitution in which the lower a possibility of being invalid the higher a determination index is computed and a command is determined to be valid in case that an updated determination result value is more than a predetermined standard value, which is contrary to the described case, also may be easily estimated from the present embodiment and embodied by simple variation, detailed description of the constitution will be omitted. Also, though the determination index is computed as a value not less than 0 in the present embodiment, since a case in which a determination index is less than 0, namely, has a minus value may be embodied by simple variation, the detailed description of the case will be omitted. However, the variation is also included in the scope of the present invention.

Hereinafter, a command validity determination method according to another embodiment of the present invention will be described. The command validity determination method according to the present embodiment is performed by a determination system 100. The determination system 100 is coupled with a search system 120. Also, in the present embodiment, a command which is a target for validity determination is in association with an advertisement system (not shown) which uses a keyword search or category search. A query included in the command is to select a search result from a search result list and receive information associated with the search result. Also, the determination system 100, the search system 120, and the advertisement system may be embodied as the same system.

The advertisement system includes account balances database in which information on account balances of an advertiser is recorded and an advertisement database in which advertiser information used for generating a search result list for each advertiser or advertisement information is recorded.

The advertiser information may include maximum advertisement cost that is paid for one advertisement by the advertiser in case that the advertisement is performed. The advertisement information may include URL information on a web page of the advertiser and introduction expression information on the web page. The advertiser information may be recorded for each keyword in case of a keyword search advertisement or recorded for each category in case of a category search advertisement.

Figure 6:
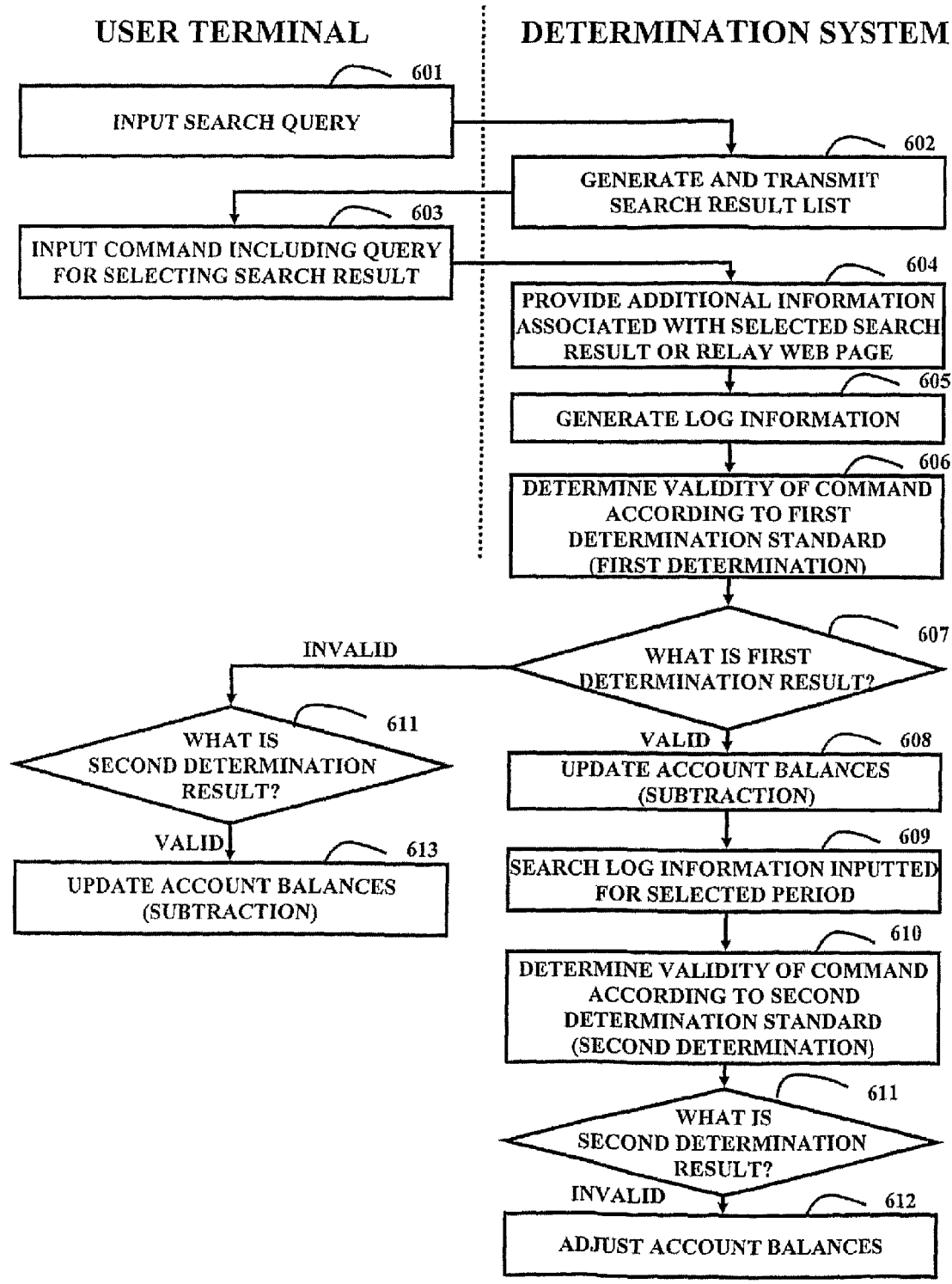
FIG. 6 is a flow chart illustrating a command validity determination method according to still another embodiment of the present invention.

FIG. 6 is flow chart illustrating a determination method according to the present embodiment.

In Step 601, the search system 120 receives a search query from the terminal 110.

In Step 6102, the search system 120 generates a search result list including at least one search result and transmits to the terminal 110 according to the search query. In the search result, an advertisement search result associated with the advertiser or a general search result regardless of the advertisement may be included.

The advertisement search result list included in the search result list is determined with reference to the advertisement database.

For example, in case that the keyword is "flower delivery", advertiser information associated with the keyword "flower delivery". The advertisement system may select a search result provided in association with the search query with reference to the maximum advertisement cost included in the advertiser information. Also, in case that the advertisement search result is separately provided from general search results, a provided advertisement search result, which is included in the search result list, may be determined for each keyword before the search query is inputted.

Also, a method of providing the selected search result to a user may be determined by the maximum advertisement cost. For example, the advertisement system arranges the selected search results by the size of the maximum advertisement cost, generates a search result list, and provides to the user.

Also, the advertisement system may generate and maintain the search result by using advertisement information associated with the advertiser information. For example, the search result may include simple introduction expression with respect to a web page of the advertiser and URL information of the web page.

In Step 603, the user receiving the search result list inputs a command including a query of selecting a search result included in the search result list to the search system 120. The selected search result may be the advertisement search result associated with the advertiser.

In Step 604, the search system 120 provides additional information associated with the selected search result to the user or relays such that the user accesses a web page associate with the search result.

In Step 605, the determination system 100 generates log information associated with the command. The log information includes a predetermined query included in the command, input time point information on an input time point of the command, a network address of the terminal. As the network address, for example, an IP address may be used.

In Step 606, the determination system 100 determines the validity of the command according to the first determination standard and computes a first determination result. The first determination may be performed in real time when a command is inputted.

In case that the command is valid as the first determination result, in Step 608, the advertisement system updates account balances of the advertiser associated with the selected search result and records in the account balances database. The update on the account balances may be performed in real time.

For example, the advertiser pays an advertisement cost in advance and a search result associated with the advertiser is selected, the advertisement cost charged on the advertiser is assumed as 1000 won. According to another embodiment of the present invention, the advertisement cost may be dynamically determined instead of being fixed, according to embodiments.

In case that the account balances of the advertiser is 100,000 won, a command for selecting the search result is inputted, and the command is valid as the first determination result of the command, the advertisement system updates the account balances with 99,000 won and records in the account balances database.

In Step 609, the determination system 100 searches log information associated with the command periodically inputted for a selected period. Also, according to another embodiment of the present invention, the determination system 100 may search only log information associated with a command classified into being suspected to be invalid as the first determination result from the commands inputted for the selected period. The search period and the selected period may be identical with each other or may be different from each other.

In Step 610, the determination system 100 determines the validity of a command associated with the searched log information according to a second determination standard and computes a second determination result.

In case that the command is invalid as the second determination result, the advertisement system adjusts the account balances of the advertiser in Step 612. Namely, since 1,000 won is subtracted from the account balances because the command is valid as the first determination result, the subtracting 1,000 from the account balances has to be compensated if the command is determined to be invalid as the second determination result. Namely, 1,000 won has to be added to a present account balances. Accordingly, the advertisement system adds 1,000 won to the account balances of the advertiser and records in the account balances database.

On the other hand, in case that the command is invalid as the first determination result in Step 607, the advertisement system does not subtract from the account balances of the advertiser. This is because expected advertisement effects are difficult to be generated in case that the search result is selected according to an invalid command such as a command illegally inputted by a competitive company.

However, in case that the command determined to be invalid as the first determination result in Step 607 is determined to be valid as the second determination result in Step 611, the advertisement system subtracts 1,000 won from the account balances of the advertiser and records in the account balances database in Step 613.

Also, according to another embodiment of the present invention, the determination system 100 may periodically perform a third determine on the command in a different period more than a plurality of times, for example, N times. In this case, each determination result is drawn according to the period, and the account balances of the advertiser may be adjusted according to the determination result. Only, in case that a determination result identical with the previous determination result is computed, it is unnecessary to adjust the account balances.

Also, according to another embodiment of the present invention, the determination system 100 further selects "suspected to be invalid" in addition to "valid" and "invalid" as the first determination result performed in Step 607 and postpones the update with respect to the account balances in case that the command is determined to be invalid. After, 1,000 won is subtracted from the account balances in case that the command is determined to be valid as the second determination result, and the account balances are not updated in case that the command is determined to be invalid as the second determination result.

Also, the embodiments of the present invention include a computer readable medium including a program instruction for executing various operations realized by a computer. The computer readable medium may include a program instruction, a data file, and a data structure, separately or cooperatively. The program instructions and the media may be those specially designed and constructed for the purposes of the present invention, or they may be of the kind well known and available to those skilled in the art of computer software arts.

Figure 7:
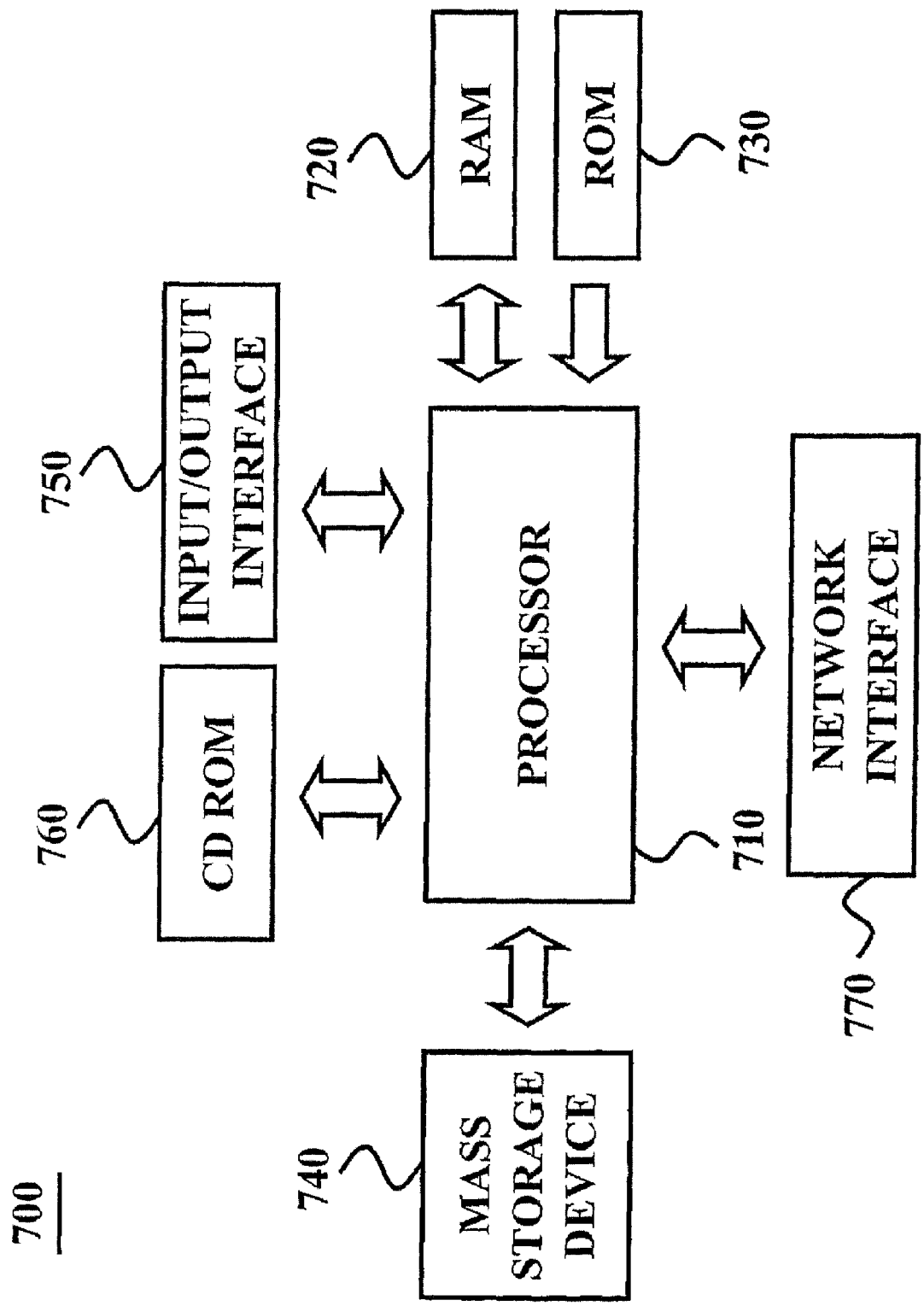
FIG. 7 is a block diagram of the inside of a universal computer apparatus capable of being employed in performing the command validity determination method according to the present invention.

FIG. 7 is a block diagram of the inside of a general use computer apparatus that may be employed in performing the command validity determination method according to the present invention.

A computer apparatus 700 includes at least one processor 710 connected to a main memory device including a RAM (Random Access Memory) 720 and a ROM (Read Only Memory) 730. The processor 710 is also called as a central processing unit CPU. As well-known to the field of the art, the ROM 730 unidirectionally transmits data and instructions to the CPU, and the RAM 720 is generally used for bidirectionally transmitting data and instructions. The RAM 720 and the ROM 730 may include a certain proper form of a computer readable recording medium. A mass storage device 740 is bidirectionally connected to the processor 710 to provide additional data storage capacity and may be one of the computer readable recording medium. The mass storage device 740 is used for storing programs and data and is an auxiliary memory. A particular mass storage device such as a CD ROM 760 may be used. The processor 710 is connected to at least one input/output interface 750 such as a video monitor, a track ball, a mouse, a keyboard, a microphone, a touch-screen type display, a card reader, a magnetic or paper tape reader, a voice or hand-writing recognizer, a joy stick, and other known computer input/output unit. The processor 710 may be connected to a wired or wireless communication network via a network interface 770. The procedure of the described method can be performed via the network connection. The described devices and tools are well-known to those skilled in the art of computer hardware and software.

The described hardware devices may be formed to be operated by at least one software module in order to perform the operations of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching.

Therefore, it is intended that the scope of the invention be defined by the claims appended thereto and their equivalents.

Although the present invention has been described in connection with the embodiment of the present invention illustrated in the accompanying drawings, it is not limited thereto since it will be apparent to those skilled in the art that various substitutions, modifications and changes may be made thereto without departing from the scope and spirit of the invention.

INDUSTRIAL APPLICABILITY

According to the present invention, a method and system for determining the validity of a command are provided, in which the validity of a command is more precisely determined by determining a plurality of times whether the command is valid.

Also, according to the present invention, a method and system for determining the validity of a command are provided, in which the validity of a command is more precisely determined by determining a plurality of times at a different time interval, for example, at a time point of inputting the command, 1 hour after inputting the command, and 24 hours after inputting the command and using information collected in the meantime.

Also, according to the present invention, a method and system for determining the validity of a command are provided, which can determine the validity of the command a plurality of times according to a plurality of determination standards different from each other.

Also, according to the present invention, a method and system for determining the validity of a command are provided, which perform additional validity determination with respect to a command whose previous determination result is the same in case that the validity of the command is determined a plurality of times.

Also, according to the present invention, a method and system for determining the validity of a command are provided, which can more precisely determine the validity of the command by setting up an intermediate area of being suspected to be invalid in addition to being valid or invalid, determining the be suspected to be invalid in case that it is difficult to determine to be valid or invalid, and determining again the validity of a command determined to be suspected to be invalid by using collected information. Also, according to the present invention, additional validity determination is performed only in case of a command whose previous determination result is suspected to be invalid.

Also, according to the present invention, a method and system for determining the validity of a command are provided, in which, in association with search service such as keyword search or category search, 1) in case that a command including a query for performing a certain advertisement is determined to be valid as a first determination result, the account balances of an advertiser associated with the advertisement is subtracted (or a cost charged on the advertiser is increased.), thereby rapidly paying an advertisement cost, and 2) in case that the command is determined to be invalid as a second determination result, the account balances is increased as the subtracted amount, thereby precisely allotting an advertisement cost in order to protect the profit of an advertiser.

Also, according to the present invention, a method and system for determining the validity of a command are provided, which can determine the validity of the command by using a determination result value computed by using a plurality of determination standards whose weight is different. In this case, in case that the validity of the command can be determined by using the determination result value computed by using some of the plurality of the determination standards, the validity of the command is determined not by using the other determination standards, thereby reducing the load on the system.

Also, according to the present invention, a method and system for determining the validity of a command are provided, which can give a determination order to the plurality of the determination standards for each weight and compute a determination result value by using some determination standards selected according to the determination order, thereby minimizing the load on the system.

Also, according to the present invention, a method and system for determining the validity of a command are provided, with respect to a terminal inputting commands determined to be invalid over a certain standard, information including warning against commands inputted from the terminal, thereby warning a user of the terminal.

The invention claimed is:

1. A computer-implemented click fraud detecting method of determining validity of a command, the method comprising the steps of:
  (a) receiving information request for receiving information from a webpage or for accessing the webpage associated with a search result of a search engine from a user terminal, the information request including a command associated with the webpage;
  (b) generating log information associated with the command, the log information including at least one of the search query included in the command, input time point information on a time point of inputting the command, and a network address of the user terminal;
  (c) recording the log information in a log database;
  (d) determining validity of the command for detecting information request with a malicious intent by using the log information previously recorded during a first time period according to a predetermined first determination;
  (e) recording identification information in the log information, the identification information being indicative of the validity information according to the first determination result;
  (f) searching for log information previously recorded during a second time period with reference to the log database; and
  (g) re-determining the validity of at least one of the determined command by using the searched log information according to a predetermined second determination, wherein the second time period is longer than the first time period, and the first determination result is one of valid, invalid, and suspected to be invalid and the step (d) comprises a step of determining that the command is the suspected to be invalid in case that the first determination result is within the error range statistically determined according to the first determination.

2. The method of claim 1, further comprising the step of: periodically repeating the steps (f)-(g).

3. The method of claim 1, wherein the step (f) of searching log information limits its search scope into the recorded log information which have the identical identification information.

4. The method of claim 3, wherein the first determination result is one of valid, invalid, or suspected to be invalid and the steps (e)-(g) are performed in case that the first determination result is the suspected to be invalid.

5. The method of claim 1, further comprising the step (h) of updating identification information included in the searched log information with identification information according to second determination result in case that the first determination result is different from a second determination result.

6. The method of claim 1, further comprising the step (i) of including second identification information according to a second determination result in the searched log information.

7. The method of claim 1, further comprising the steps of:
(j) periodically searching the log information recorded for a third time period and including identical identification information with reference to the log database, in which the third time period is longer than the second time period; and
(k) determining the validity of command associated with the searched log information according to a predetermined third determination and calculating a third determination result.

8. The method of claim 1, wherein the step (c) of recording the log information in a log database comprises the steps of:
(l) discriminating a query included in the command; and
(m) recording the log information in the log database according to a sort of the discriminated query.

9. The method of claim 1, wherein one of the first determination and the second determination is associated with a network address of the user terminal, further comprising the steps of:
(n) identifying a network address of the user terminal from which the command was received, wherein the received command is determined to be invalid as a second determination result more than a predetermined number of times with reference to the log information recorded in the log database; and
(o) recording the identified network address as a blocked network address in a blocked network address database.

10. The method of claim 9, in case that a command is inputted from a user terminal having the blocked network address, further comprising a step of providing a predetermined web page to the terminal, in which the web page is different from a web page provided according to the query.

11. A computer-implemented click fraud detecting method of determining validity of a command, comprising the steps of:

receiving information request for receiving information from a webpage or for accessing the webpage associated with a search result of a search engine from a user terminal, the information request including a command associated with the webpage;

generating log information associated with the command, the log information including at least one of the search query of the command, input time point information on the input time point of the command, and a network address of the user terminal;

recording the log information in a log database;

determining validity of the command for detecting information request with a malicious intent by using the log information previously recorded during a first time period according to a predetermined first determination;

recording predetermined identification information in the log information associated with the command, the predetermined identification information being indicative of at least one category of the validity;

searching for log information previously recorded during a second time period with reference to the log database; and periodically re-determining the validity of the command associated with the log information, whose identification information falls into a predetermined category of the validity, according to a predetermined second determination, wherein the second time period is longer than the first time period, and a first determination result is one of valid, invalid, and suspected to be invalid and the step of determining validity of the command comprises a step of determining that the command is the suspected to be invalid in case that the first determination result is within the error range statistically determined according to the first determination.

12. A computer-implemented click fraud detecting method of determining validity of a command, comprising the steps of:

receiving information request for receiving information from a webpage or for accessing the webpage associated with a search result of a search engine from a user terminal, the information request including a command associated with the webpage;

generating log information associated with the command, the log information including at least one of the search query included in the command, input time point information on the input time point of the command, and a network address of the terminal;

recording the log information in a log database;

determining validity of the command for detecting information request with a malicious intent by using the log information previously recorded during a first time period according to a predetermined first determination;

maintaining first determination result in association with the command in a predetermined storage means;

searching for log information previously recorded during a second time period with reference to the log database; and re-determining the validity of the command by using the searched log information according to a predetermined second determination, wherein the second time period is longer than the first time period, and the first determination result is one of valid, invalid, and suspected to be invalid and the step of determining validity of the command comprises a step of determining that the command is the suspected to be invalid in case that the first determination result is within the error range statistically determined according to the first determination.

13. The method of claim 12, further comprising the steps of:

maintaining a second determination result associated with the command in a storage means; and updating the first determination result associated with the command with a second determination result in the storage means.

14. A system for determining validity of a command, comprising:
- a processor;
- one or more memories to communicate with the processor, the one or more memories storing a log database, the log database including log information associated with a command, said log information including at least one or a query included in the command, input time information on a time point of inputting the command, and a network address of a user terminal;
- a user input unit, the user input unit receiving information request for receiving information from a webpage or for accessing the webpage associated with a search result of a search engine from said user terminal, the information request including a command associated with the webpage;
- a log information management unit, the log information management unit generating the log information associated with the command, the log information management unit recording in the log database; and
- a validity determination unit, the validity determination unit determining validity of the command for detecting information request with a malicious intent by using the log information previously recorded during a first time period according to a predetermined first determination, the validity determination unit calculating each determination result with respect to the validity of the command for each predetermined period by using the log information, the validity determination unit re-determining the validity of the command by using the log information previously recorded during a second time period according to a predetermined second determination,
- wherein the second time period is longer than the first time period, and a first determination result is one of valid, invalid, and suspected to be invalid and the validity determination unit determines that the command is the suspected to be invalid in case that the first determination result is within the error range statistically determined according to the first determination.

15. The system of claim 14, wherein, whenever a determination result is calculated, the log information management unit updates the log information by reflecting the determination result.

16. The method of claim 11, wherein the predetermined category of the validity is the invalidity.

17. The method of claim 11, wherein the predetermined category of the validity is the command determined to be suspected to be invalid.

18. The method of claim 1, wherein the query included in the command is a search query to which a search result list is provided to the user in response, further comprising the step of updating balance of an account of an advertiser associated with the search result in case that the command is determined to be valid as a result of the first determination.

19. The method of claim 18, further comprising a step of adjusting the balance of the account in case that the command is invalid as a second determination result.

20. The method of claim 18, further comprising a step of updating the balance of the account associated with the search result in case that the command is invalid as the first determination result and the command is valid as a second determination result.

21. The method of claim 18, further comprising a step of including identification information corresponding to suspected to be invalid in the log information in case that the command is the suspected to be invalid,
- wherein the step (f) of searching the log information recorded for the second time period comprises a step of periodically searching log information that is associated with the command inputted for the selected period and includes the identification information corresponding to the suspected to be invalid with reference to the log database.

22. The method of claim 21, further comprising a step of updating the balance of the account of the advertiser associated with the search result in case that the command is valid as a second determination result.

23. One or more computer-readable media having stored thereon a computer program that, when executed by one or more processors, causes the one or more processors to perform acts including:
- (a) receiving information request for receiving information from a webpage or for accessing the webpage associated with a search result of a search engine from a user terminal, the information request including a command associated with the webpage;
- (b) generating log information associated with the command, the log information including at least one of the search query included in the command, input time point information on a time point of inputting the command, and a network address of the user terminal;
- (c) recording the log information in a log database;
- (d) determining validity of the command for detecting information request with a malicious intent by using the log information previously recorded during a first time period according to a predetermined first determination;
- (e) recording identification information in the log information, the identification information being indicative of the validity information according to a first determination result;
- (f) searching for log information previously recorded during a second time period with reference to the log database; and
- (g) re-determining the validity of at least one of the determined command by using the searched log information according to a predetermined second determination,
- wherein the second time period is longer than the first time period, and the first determination result is one of valid, invalid, and suspected to be invalid and the step of determining validity of the command comprises a step of determining that the command is the suspected to be invalid in case that the first determination result is within the error range statistically determined according to the first determination.

* * * * *